United States Patent
Liu et al.

(10) Patent No.: US 8,200,852 B2
(45) Date of Patent: Jun. 12, 2012

(54) MULTI-MODE DONGLE FOR PERIPHERAL DEVICES AND ASSOCIATED METHODS

(75) Inventors: Chin-Jui Liu, Xizhi (TW); Bo Hom, Round Rock, TX (US); Hsien-Tsung Lin, Shin-Chuang (TW)

(73) Assignee: Dell Products, L.P., Round Rock, TX (US)

( * ) Notice: Subject to any disclaimer, the term of this patent is extended or adjusted under 35 U.S.C. 154(b) by 195 days.

(21) Appl. No.: 12/587,646

(22) Filed: Oct. 9, 2009

(65) Prior Publication Data

US 2011/0087805 A1 Apr. 14, 2011

(51) Int. Cl.
*G06F 3/00* (2006.01)
*H04J 3/00* (2006.01)
(52) U.S. Cl. ............................ 710/4; 370/464
(58) Field of Classification Search .................... 710/14; 370/464
See application file for complete search history.

(56) References Cited

U.S. PATENT DOCUMENTS

| | | | |
|---|---|---|---|
| 6,144,363 A * | 11/2000 | Alloul et al. | 345/618 |
| 6,184,652 B1 | 2/2001 | Yang | 320/110 |
| 7,239,111 B2 | 7/2007 | Fischer et al. | 320/111 |
| 7,453,233 B2 | 11/2008 | Fischer et al. | 320/111 |
| 7,525,216 B2 | 4/2009 | Tupman et al. | 307/39 |
| 2002/0147036 A1* | 10/2002 | Taguchi et al. | 455/573 |
| 2007/0280282 A1* | 12/2007 | Tzeng et al. | 370/464 |
| 2008/0042616 A1 | 2/2008 | Monks et al. | 320/106 |
| 2009/0051319 A1 | 2/2009 | Fang et al. | 320/115 |

* cited by examiner

*Primary Examiner* — Hyun Nam
(74) *Attorney, Agent, or Firm* — O'Keefe, Egan, Peterman & Enders, LLP (57) ABSTRACT

Methods and systems are described for utilizing multi-mode dongles with peripheral devices. The multi-mode dongles are configured to provide standard mode signals for a standard mode of operation and alternate mode signals for an alternate mode of operation, for example, where a host information handling system is unable to provide the alternate mode signals to the peripheral device. The multi-mode dongle receives mode control signals from a host information handling system and automatically switches from a standard mode of operation to an alternate mode of operation, where the alternate mode signals are provided to the peripheral device, based upon the mode control signals. In one embodiment, the multi-mode dongle can be configured for a universal serial bus (USB) port, and the alternate mode signals can be associated with charging a consumer electronics (CE) device.

22 Claims, 6 Drawing Sheets

MULTI-MODE DONGLE FOR PERIPHERAL DEVICES AND ASSOCIATED METHODS

TECHNICAL FIELD OF THE INVENTION

This invention relates to techniques for controlling modes of operation associated with peripheral devices connected to an information handling system and, more particularly, to peripheral devices connected to a universal serial bus (USB) port.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are configured to provide different modes of operation associated with peripheral devices connected to ports on the information handling system. For example, a host information handling system may desire to operate in a first mode under a first set of conditions and a second mode under a second set of conditions when a device is connected to a communication port on the information handling system. One example for this multi-mode operation based upon different operation conditions is the POWERSHARE ports provided on certain DELL portable computer systems.

POWERSHARE ports are configured to charge peripheral devices through their connection to a universal serial bus (USB) port on the information handling system, even when the host system is powered off. For example, using these POWERSHARE ports, users can charge external consumer electronic (CE) devices while the CPU (central processing unit) is in lower power states, such S4 or S5 power states. When the CE is attached to the USB port when the host system is in an S4 or S5 state, the host system detects this event and applies a charging voltage to the USB voltage line. In addition, users do not need to turn on the systems to charge the CE devices. The POWERSHARE port is configured to provide a charging voltage even if the host system is powered off. This feature provides users more portability with their CE devices. When the CE device is plugged into POWERSHARE enabled USB port when the CPU is in a S4 or S5 or off state, the insertion of USB device triggers the USB detection pin and powers up an embedded controller within the host system. The embedded controller then goes into a charging sub-routine and turns on a five volt charging voltage that is applied to the USB voltage line to charge the external device.

Figure 4:
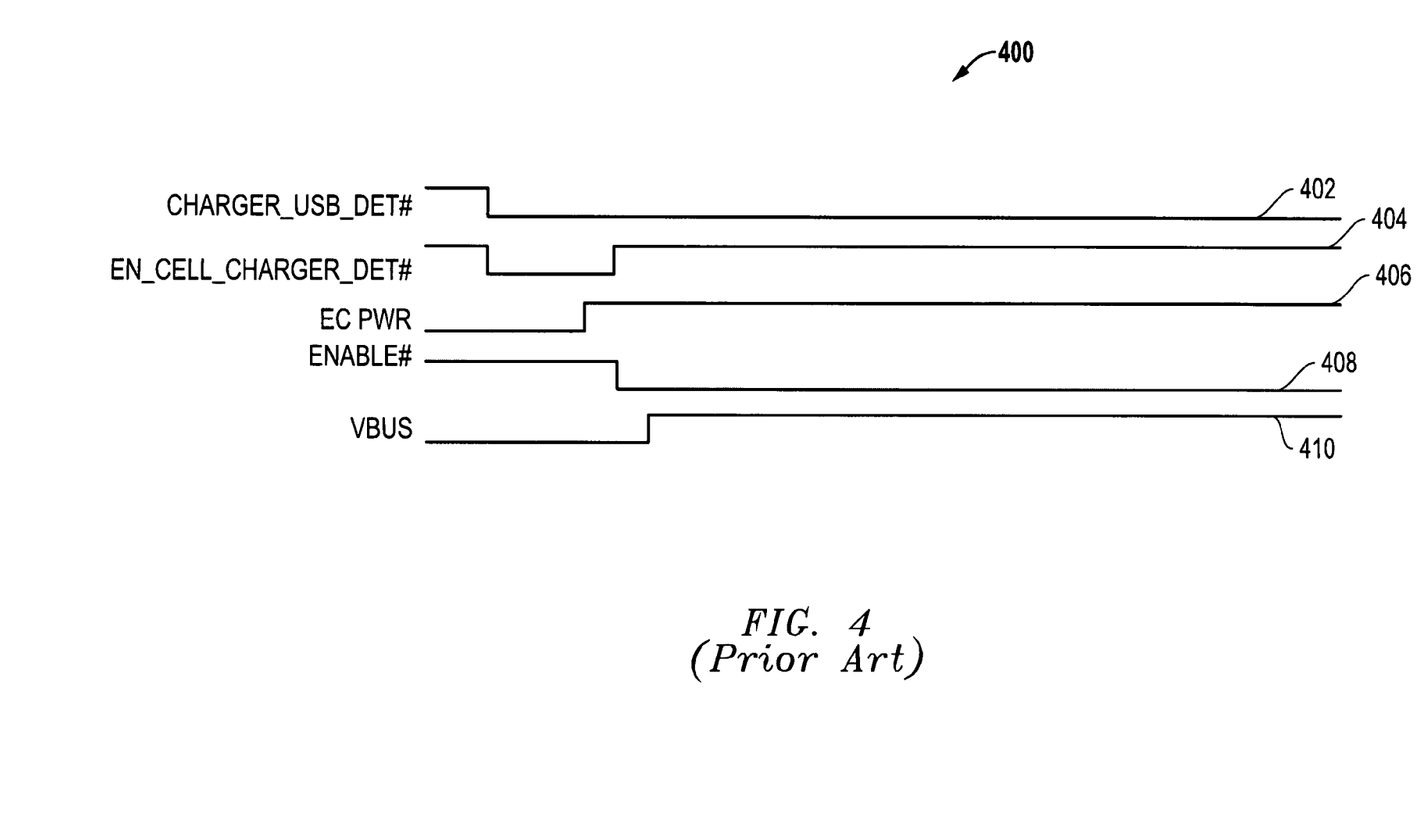
FIG. 4 (Prior Art) is a timing diagram for a prior charging system.

FIG. 4 (Prior Art) is a timing diagram 400 for a prior USB charging system associated with this POWERSHARE operation. As with current USB connectors, the POWERSHARE enabled USB port includes four connection lines: VBUS (5 volts), D+ (positive-side differential signal), D− (negative-side differential signal), and GND (ground). When a peripheral device is connected to the USB port of a host information handling system with POWERSHARE while the host CPU is in S4 or S5 power states (or off), the host system generates internal signals 402, 404, 406 and 408 based upon its detection of a device being connected to the USB port. Signal (CHARGER_USB_DET#) 402 represents detection of a USB charge event (active low) when a device is connected to the USB port when the host system is in a condition that will allow charging of an external device through the USB port (e.g., CPU in S4, S5 or off). Signal (EN_CELL_CHARGER_DET#) 404 represents an enable signal to enable power to an embedded controller (active low). An embedded controller power signal (EC PWR) 406 is then generated and applied to an embedded controller within the host system. Once powered by the power signal 406, the embedded controller is configured to apply an enable signal (ENABLE#) 408 to a USB power integrated circuit (IC), which in turn applies a charging voltage (e.g., five volts) to the VBUS line for the USB connection, as represented by signal 410. This USB charging voltage is used to charge the peripheral device connected to the USB port, even when the host system is powered off.

Unfortunately, certain peripheral devices, such as APPLE iPHONE and BLACKBERRY smart phones, require particular conditions on the USB port before they will recognize the connection to a powered-off system as a wall connected power source for charging the device. In particular, these devices look for a DC (direct current) voltage bias on the D+ and D− pins on the USB connector as an indication that the device has been connected to a wall plug. Because of this DC voltage bias operation, information handling systems enabled with POWERSHARE may have difficulty providing the proper DC bias conditions for these peripheral devices to recognize that they should accept an external charging condition from the USB when the system is powered off.

More generally, information handling systems that have been configured to operate under certain expected conditions may have difficulty if those conditions do not meet particular peripheral device configurations. The USB charging conditions addressed above are an example of this need for dual mode operation where a host system hardware has not been configured to address these different peripheral device configurations.

SUMMARY OF THE INVENTION

Methods and systems are described for utilizing multi-mode dongles with peripheral devices. The multi-mode dongles are configured to provide standard mode signals for a standard mode of operation and alternate mode signals for an alternate mode of operation, for example, where a host information handling system is unable to provide the alternate mode signals to the peripheral device. The multi-mode dongles are further configured to be connected to a communication port on the host information handling system and to the peripheral device. The multi-mode dongle receives mode control signals from the host information handling system and automatically switches from a standard mode of operation to an alternate mode of operation, where the alternate mode signals are provided to the peripheral device, based upon the mode control signals. In a particular embodiment, the communication port can be a universal serial bus (USB) port, and the alternate mode signals can be direct current (DC) voltage biased differential data signals (D+, D−) that are configured to cause certain peripheral devices to accept a charging voltage on a voltage line for a USB port. Still further, the host information handling system can be configured to send the mode control signals to the dongle only when the host information handling system detects a connection to the USB port while the host system in is a selected power state, such as a powered off state. As described below, other features and variations can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In some systems, it is desirable to provide different modes of operational conditions associated with peripheral devices connected to ports on the information handling system. For example, a host information handling system may desire to operate in a first mode under a first set of conditions and a second mode under a second set of conditions. One example for this multi-mode operation based upon different operation conditions is the POWERSHARE ports provided on certain DELL computer systems. POWERSHARE ports are configured to charge peripheral devices through their connection to a universal serial bus (USB) port on the information handling system, even when the host system is powered off. As described above, some peripheral devices expect certain conditions that may be inconsistent with the operation of the POWERSHARE ports. More generally, systems that have been configured to operate under certain expected conditions may have difficulty if those conditions do not meet particular peripheral device configurations.

The embodiments described herein provide solutions to problems associated with host information handling systems that are configured to operate under certain expected conditions with respect to external devices to be connected to a connection port on the host system and that are desired to operate with peripheral devices that do not operate according to those expected conditions. As described herein, a dongle is provide that connects to the connection port on the host system and connects to the peripheral device. The dongle provides mode selection circuitry that outputs standard mode signals or alternate mode signals to the connected peripheral device based upon mode control signals received from the host system. In this way, even if the host system is not capable of providing the proper operating conditions for the external device, the dongle can provide those operational conditions.

Figure 1A:
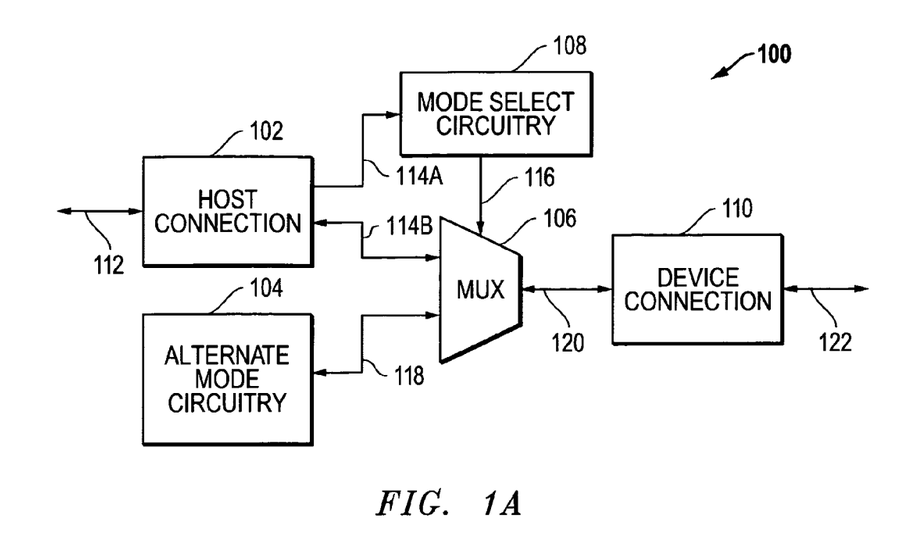
FIG. 1A is a block diagram for a dongle that can be connected to a host connection to provide multiple modes of operational conditions to a device connection.
Figure 1B:
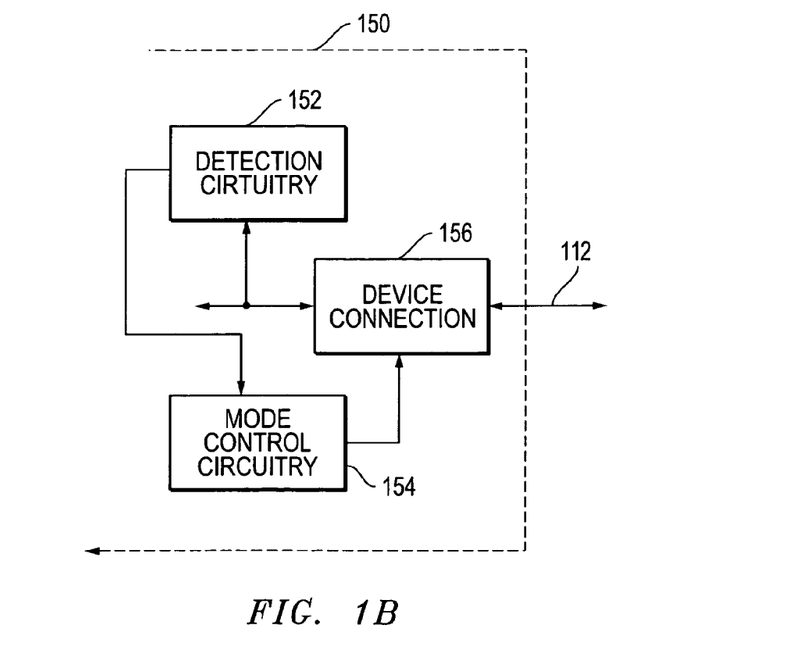
FIG. 1B is a block diagram for circuitry within the host information handling system.
Figure 2:
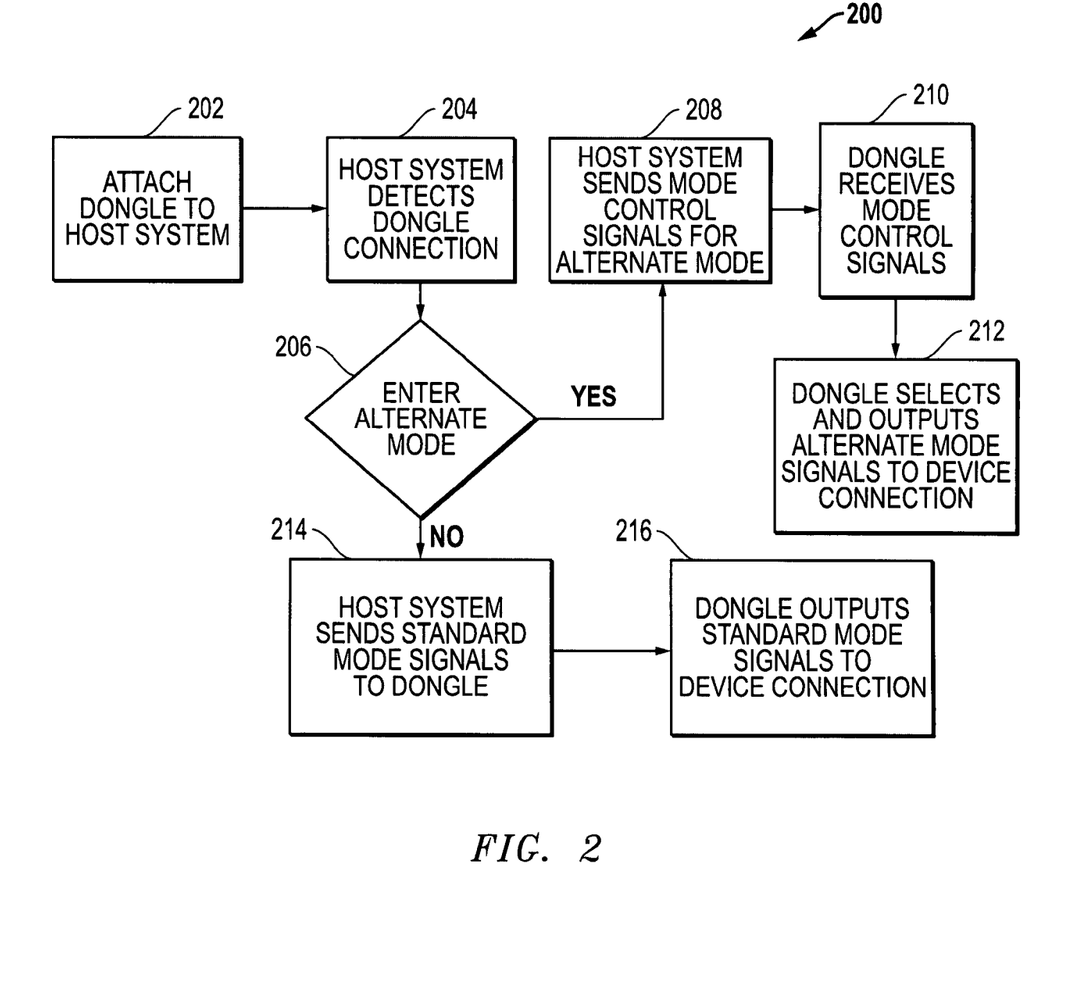
FIG. 2 is a block diagram for a process that utilizes the dongle of FIG. 1A.
Figure 3A:
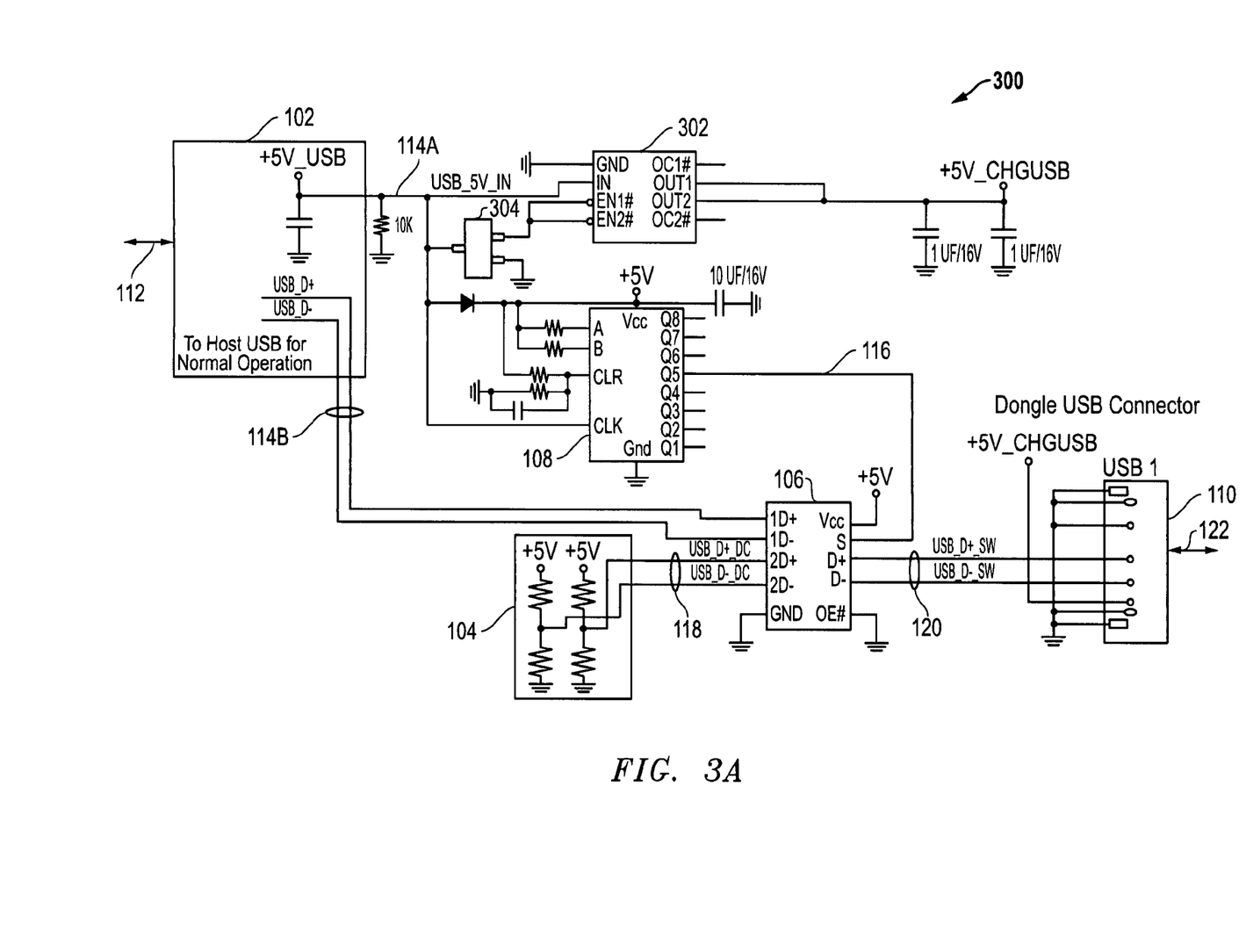
FIG. 3A is a circuit diagram for a USB dongle having dual mode operation.
Figure 3B:
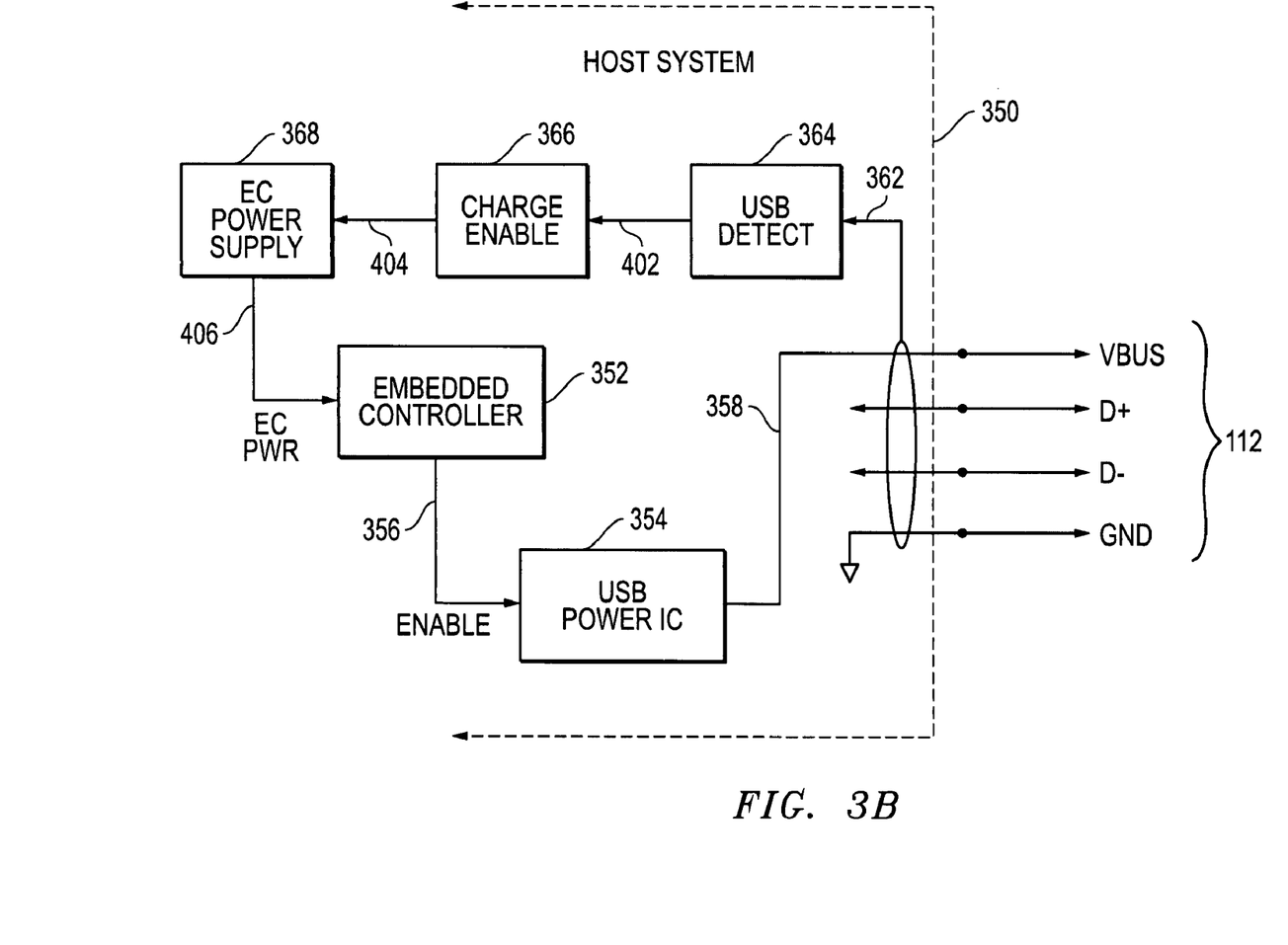
FIG. 3B is a block diagram for host system connections for the USB dongle of FIG. 3A.
Figure 5:
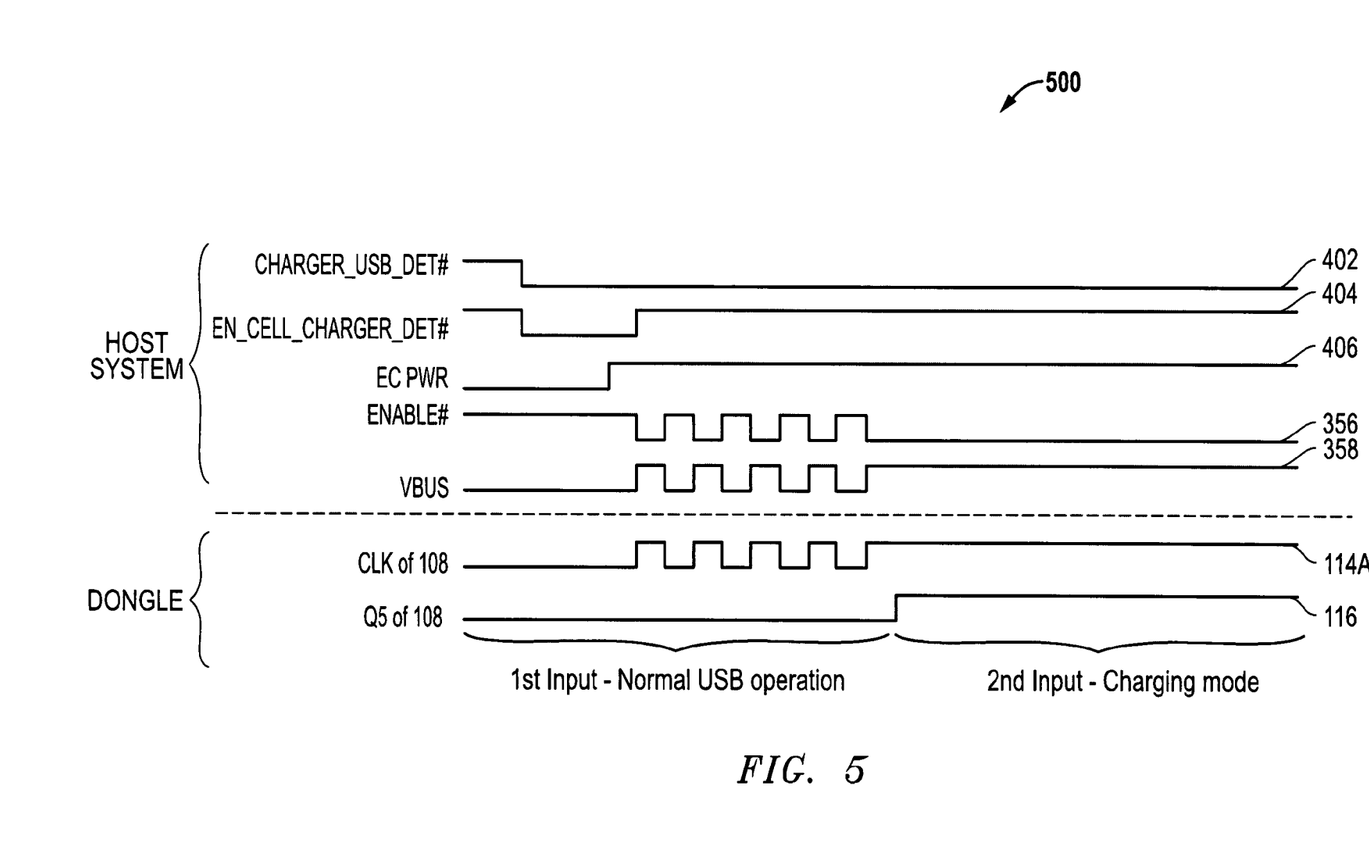
FIG. 5 is a timing diagram for a charging system using the USB dongle of FIG. 3A.

FIGS. 1A, 1B and 2 provide example embodiments for using a dongle to provide standard mode signals or alternate mode signals to a connected device based upon mode control signals received from the host system. FIGS. 3A, 3B and 5 provide example embodiments more specifically directed to USB port connections where the dongle provides standard USB signals or alternate USB signals with a DC bias voltage based upon mode control signals received from the host information handling system.

FIG. 1A is a block diagram for a dongle 100 that can be connected to a host connection 102 to provide multiple modes of operation to a device connection 110. As depicted, the dongle 100 is connected to a host system through a host connection 102 and communicates with the host system through signals 112. At least a portion of these signals 112 are provided to mode select circuitry 108 as mode control signals 114A. The mode control signals 114A at least in part determine the mode of operation selected by the mode select circuitry 108 through the mode select signal 116. At least a portion of the signals 112 are also provided to a multiplexer (MUX) 106 as standard mode signals 114B. The MUX 106 also receives alternate mode signals 118 from alternate mode circuitry 104. The mode select circuitry 108 provides the model select signal 116 to the MUX 106, and the mode select signal 116 determines whether the standard mode signals 114B or the alternate mode signals 118 are provided as the output 120 from the MUX 106 to the device connection 110. The device connection 110 is connected to the peripheral device and communicates through signals 122.

It is noted the MUX 106 provides selection between two bi-directional channels according to a first set of inputs (Channel 1) and a second set of inputs (Channel 2). As depicted, therefore, if the standard mode signals 114B are selected for MUX 106, then the dongle allows communication between the host system and the peripheral device using a standard mode connection conditions. If the alternate mode signals 118 are selected for MUX 106, then the dongle allows communication between the host system and the peripheral device using the alternate mode connection conditions.

FIG. 1B is a block diagram for circuitry within the host information handling system 150. The device connection 156 communicates with external devices through signals 112. The detection circuitry 152 is coupled to the device connection and determines when a device is coupled to the device connection 156. When the detection circuitry 152 detects the connection of a device under conditions for which an alternate mode is enabled, the detection circuitry 152 sends one or more enable signals to the mode control circuitry 154. The mode control circuitry 154 then sends mode control signals through the device connection 156 to signals 112. When a dongle 100 is connected to the device connection 156, these mode controls signals are received by the dongle 100, as described above.

FIG. 2 is a block diagram for a process 200 that utilizes the adapter dongle 100 of FIG. 1A and the host system circuitry of FIG. 1B. First, the dongle 100 is attached to the host information handling system 150 in block 202. In block 204, the host system 150 detects the connection of the dongle 100 to the host connection port. In decision block 206, a determination is made whether the host system 150 is in condition to allow the alternate mode of operation. If "YES," the flow passes to block 208 where the host system 150 sends mode control signals for switching to the alternate mode to the dongle 100 through the connection port. In block 210, the dongle receives the mode control signals. And in block 212, the dongle 100 selects and outputs the alternate mode signals to the device connection. If the determination in decision block 206 is "NO," then flow passes to block 214 where the host system sends standard mode signals to the dongle 100 through the connection port. In block 216, the dongle then outputs the standard mode signals to the device connection.

It is noted that the dongle 100 could take many forms depending upon the type of host connection and the type of device connection. In addition, while the discussion below focuses on adjusting how a host information handling system powers or charges peripheral devices connected to a USB port, the dongle 100 could also be used to modify the operation of a device connection port on the host system between other desired operational mode conditions.

FIGS. 3A, 3B and 5 now describe embodiments where the host connection port is a USB port and where the mode of operation is related to charging an external device that is connected to the USB port through the dongle.

The embodiment of FIG. 3A depicts a dongle 300 that provides an interface between a USB port on a host information handling system enabled to provide a POWERSHARE connection and an external device that relies upon a DC bias voltage to recognize a power source from a powered-off system, such as a wall outlet. The dongle 300 supports an alternate charging mode and a normal USB mode of operation, and the dongle 300 provides auto-switching between these two modes based upon mode control signals received from the host system.

FIG. 3A is a circuit diagram for a USB dongle 300 having dual mode operation. The host system is connected to the dongle 300 through host connection 120 and communicates with the dongle 300 through signals 112. For this USB connection, the signals 112 include the following signal lines: VBUS (5 volts), D+ (positive-side differential signal), D− (negative-side differential signal), and GND (ground). The dongle 300 has a USB connector 110 for connection to the peripheral device and communicates with the peripheral device through signals 122. Likewise, for this USB connection, the signals 122 include the following signal lines: VBUS (5 volts), D+ (positive-side differential signal), D− (negative-side differential signal), GND (ground). As described in more detail below, the dongle 300 provides these signals in a standard mode as a USB charging voltage (CHGUSB), differential data signals (D+, D−), and ground (GND). The dongle 300 provides these signals in an alternate mode as a USB charging voltage (CHGUSB), differential data signals with a direct current (DC) bias voltage (D+_DC, D−_DC), and ground (GND).

In the embodiment depicted, the VBUS signal line from the host connection 102 is used to provide the mode control signals 114A to the mode selection circuitry 108. The differential data signals (USB_D−, USB_D+) from the host connection 102 provide the standard mode signals 114B to the MUX 106. A resistor divider network within the alternate mode circuitry 104 provides alternate mode signals 118 to the MUX 106. These alternate mode signals 118 provide the differential USB data signals with a DC bias voltage (USB_D+_DC, USB_D−_DC). The mode selection circuitry 108 provides a mode select signal 116 to the MUX 106, and the MUX 106 provides the selected output signals 120 to the peripheral device connector 110.

The circuitry for the dongle 300 includes a USB power integrated circuit (IC) 302, a power-on-reset IC 304, a serial-to-parallel IC 306, a multiplexer (MUX) IC 106, a USB connector 110, and resistor network circuitry 104. The power IC 302 receives the VBUS signal 114A from the host connection 102, and the power IC 302 generates the CHGUSB charging voltage as its output. The power-on-reset IC 304 also receives the VBUS signal 114A from the host connection 102, and the power-on-reset IC 304 provides an output signal to the enable inputs for the power IC 302. The serial-to-parallel IC 306 also has its clear (CLR) input coupled to the VBUS signal line and ground through resistor. This causes the CLR pin be grounded initially, and then rise to a high logic level. The serial-to-parallel IC 306 also has its data inputs (A, B) coupled to the VSUB signal line through resistors so that a logic high level is received as data. The serial-to-parallel IC 306 further has its clock input (CLK) coupled to the VSUB signal line. The $5^{th}$ output pin (Q5) of the serial-to-parallel IC 306 is connected to the selection input (S) for the MUX 106 as the mode selection signal 116. The MUX 106 has the D+ and D− signals from the host connection 102 connected to a first set of inputs (Channel 1) as the standard mode signals 114B, and the MUX 106 has the D+_DC and D−_DC signals from the alternate mode circuitry 104 connect to a second set of inputs (Channel 2) as the alternate mode signals 118. The MUX 106 then provides a bi-direction connection between one of these sets of inputs and the device connection 110 depending upon the mode selection signal 116. As depicted, the voltage divider circuitry within the alternate mode circuitry 104 provides a DC bias of 2.5 volts on each of the alternate mode signals (D+_DC, D−_DC) 118.

More particularly, the circuitry depicted in FIG. 3A includes the following particular integrated circuits (ICs): TPS2062 (USB power IC), CD74AC164 (serial-to-parallel IC), MAX6461 (power-on-reset IC) and TS3USB221 (bi-directional channel multiplexer IC). The TPS2062 is a USB power IC used to block USB power until MAX6461 is ready. MAX6461 asserts a logic low level to enable TPS2062 when the USB voltage rises to a threshold level that triggers the MAX6461 to output this enable signal. CD74AC164 is serial-to-parallel IC used to select the multiplexer channel. TS3USB221 is the multiplexer for selecting a charging mode (Channel 2) or normal USB operation mode (Channel 1). Pin Q5 of CD74AC164 is connected to the TS3USB221 select pin (S). This signal is default "low level" when the dongle 300 is plugged into POWERSHARE enabled USB port so that the default setting is normal USB operation mode. As described further below, pin Q5 is changed to a "high level" when five pulses are applied by the embedded controller within the host system to the VUSB line. TS3USB221 is then switched to its second input (Channel 2) to support charging of an external CE device. If the host system does not provide these five pulses, the dongle 300 will remain in normal USB operation mode and will not switch into the alternate charging mode.

FIG. 3B is a block diagram for host system connections for the USB dongle 300 of FIG. 3A. As depicted, a host system 350 includes a USB power IC 354, an embedded controller 352, USB detect circuitry 364, charge enable circuitry 366 and an embedded control (EC) power supply 368. The USB detect circuitry 364 is connected to the USB port through connections 362 (VBUS, D+, D−, GND). The USB detect circuitry 364 is configured to determine when a peripheral device has been connected to the USB port for charging, for example, when the CPU for host system 350 is in state S4, S5 or powered off. The USB detect circuitry 364 provides a charge enable signal 402 to the charge enable circuitry 366, which in turn provides a power enable signal to the EC power supply 368. The EC power supply circuitry 368, once enabled, applies an EC power signal (EC PWR) 406 to the embedded controller 352. The embedded controller 352 in turn provides an enable signal 356 to the USB power IC 354. The USB power IC 354 provides voltage signals 358 to the VBUS connection as part of the signals 112.

When the dongle 300 is plugged into a POWERSHARE enabled USB port when the host system is in a S4 or S5 or off mode, the insertion of USB device triggers the USB detect circuitry 364 and causes the embedded controller 352 to be powered up within the host system 350. The embedded controller 352 then goes into a charging sub-routine and causes the charging voltage on the VBUS line to be pulsed five times by the USB power IC 354. As described further below, these five pulses on the VBUS line causes the mode select signal 116 (Pin Q5 of CD74AC164) to transition to a high logical level, thereby switching the multiplexer (TS3USB221) 108 to its second input (Channel 2) to couple the alternate mode signals (D+_DC, D−_DC) 118 to the USB connection port 110. This switching, therefore, causes a DC bias voltage of 2.5 volts to be applied to the D+ and D− signals lines from the resistor network circuitry 104. These DC biased signals are then received by the connected CE device. As described above, certain CE devices require these DC biased signals to enable certain charging modes.

FIG. 5 is a timing diagram 500 for a charging system using the USB dongle 300 of FIG. 3A and the host system circuitry of FIG. 3B. Signals occurring within the host system 350 are at the top of the timing diagram 500, and signals occurring within the dongle 300 are at the bottom of the timing diagram 500, as indicated.

Within the host system 350, the USB detect circuitry 364 generates signal (CHARGER_USB_DET#) 402 based upon detection of a device being connected to the USB port when the host system is in certain conditions, such as a CPU state of S4, S5 or off. As depicted signal (CHARGER_USB_DET#) 402 is active low. The charge enable circuitry 366 then generates signal (EN_CELL_CHARGER_DET#) 404, which represents an enable signal for enable charging of the peripheral device and is also active low. The EC power supply 368 then applies an EC power signal (EC PWR) 406 to the embedded controller 352. Once powered, the embedded controller 352 toggles a power enable signal (ENABLE#) 356 to the USB power IC 354. As depicted, this power enable signal (ENABLE#) 356 is pulsed five times and is active low. The USB power IC 354 then in turn toggles five pulses on the USB power signal line (VBUS) through its output signal 358.

These toggled VBUS pulse signals are then received by the dongle 300 through connections 112.

Within the dongle 300, the toggling VBUS signal 358 is received by the clock (CLK) input of mode select circuitry 108 through the host connection 102 as mode control signals 114A. As described above, the serial-to-parallel circuitry 108 in FIG. 3A provides the mode select signal 116 to the MUX 106 through its Q5 output. After 5 pulses are received on the CLK input of the serial-to-parallel IC 108, the Q5 output (signal 116) of the serial-to-parallel IC 108 will transition from a low logic level to a high logic level as indicated in FIG. 5. When the Q5 output is at a low logic level, the first input signals (standard mode signals 114B) to MUX 106 are coupled as an output for normal USB operation. When the Q5 output is at a high logic level, the second input signals (alternate mode signals 118) to MUX 106 are coupled as an output for charging mode operation.

It is noted that the serial-to-parallel IC 108 is configured to shift the bit received at its data input (A/B) consecutively through the output pins (Q1, Q2, Q3, Q4, Q5, Q6, Q7, Q8) based upon clock signals received at its clock (CLK) input. Thus, because the data input (A/B) is tied to the VBUS signal line (+5 volts) through a resistor, it is a logic high level. All output pins are initially set to a low logic level through the CLR pin being connected to ground and the VBUS signal line (+5 volts) through resistors. As the VBUS signal line (+5 volts) rises, the input to the CLR pin will transition from low (reset) to high. When the clock (CLK) input is toggled five times by the toggling of the VBUS line by the host system 350, the serial-to-parallel IC 106 shifts a logic "1" to Q1, then Q2, then Q3, then Q4 and finally to Q5. Thus, after this fifth toggle pulse, the outputs Q1-Q8 will hold "11111000."

It is further noted that the toggling of the VBUS signals is conducted at a fast enough clock speed so as not to drop the voltage on the data input (A/B) or the clear (CLR) input below a logic high level and at a speed recognized by the clock (CLK) input on the serial-to-parallel IC 108. It is also noted that the VBUS connection to the data input (A/B) is connected through a diode so as to further keep the voltage at the data input (A/B) from dropping below a logic high level. Similarly, the Vcc pin for the of serial-to-parallel IC 108 is connected to VBUS through the diode and a bulk capacitance. The diode and bulk capacitance operate to keep the voltage level at about 5 volts (as indicated by the +5V symbol) when the pulse signals applied on the VBUS line by the host system.

Furthermore, the selection of five toggle pulses and the use of Q5 on the serial-to-parallel IC 108 could be adjusted, if desired. For example, the Q4 pin or the Q6 pin or other output pins could be used. However, it may be desirable to include enough pulses so as to limit the possibility of spurious signals causing a switch in modes of operation and not so many pulses at to slow down the operation of the dongle in switching modes when a switch is desired. In addition, the different mode control signals and mode selection circuitry could be implemented, as desired. The use of pulses to a serial-to-parallel IC and the use of one of the parallel output pins as the mode selection signal provide just one example for how this circuitry could be implemented with a dongle. The other circuitry within the dongle could also be modified depending upon the device connection being used and the operational modes desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A multi-mode dongle for a peripheral device, comprising:
   a host connection port configured to be coupled to a communication port on a host information handling system;
   a device connection port configured to be coupled to a peripheral device;
   mode selection circuitry within the multi-mode dongle configured to receive mode control signals from the host information handling system through the host connection port and configured to output a mode selection signal;
   alternate mode circuitry within the multi-mode dongle configured to generate alternate mode signals, the alternate mode signals representing signals that the host information handling system is not capable of providing to the peripheral device from the communication port; and
   multiplexer circuitry coupled to receive standard mode signals from the host connection port and the alternate mode signals from the alternate mode circuitry within the multi-mode dongle, the multiplexer circuitry being configured to couple either the standard mode signals or the alternate mode signals to the device connection port depending upon the mode selection signal.

2. The multi-mode dongle of claim 1, wherein the host connection port comprises a universal serial bus (USB) port and wherein the device connection port comprises a USB port.

3. The multi-mode dongle of claim 2, wherein the standard mode signals comprise USB signals, wherein the alternate mode signals comprise USB signals having direct current (DC) bias voltages, and wherein the USB signals having DC bias voltages are configured to cause the peripheral device to accept a charging voltage through the device connection.

4. The multi-mode dongle of claim 3, wherein the alternate mode circuitry comprises a resistor network configured to provide the DC bias voltages as outputs.

5. The multi-mode dongle of claim 4, wherein the resistor network circuitry comprises a first resistor divider coupled to provide a first DC bias voltage for a positive differential data line for the USB port and a second resistor divider coupled to provide a second DC bias voltage for a negative differential data line for the USB port.

6. The multi-mode dongle of claim 2, wherein the multiplexer is configured to provide bi-directional USB communications between the host connection port and the device connection port.

7. The multi-mode dongle of claim 2, wherein the mode control signals comprise pulses applied by the host information handling system to a voltage signal line for the USB port during mode configuration.

8. The multi-mode dongle of claim 7, wherein the mode selection circuitry comprises a serial-to-parallel integrated circuit (IC) having its clock input coupled to the voltage signal line for the USB port, wherein the serial-to-parallel IC is configured to shift a data input through a plurality of output pins based upon the pulses applied to the voltage signal line for the USB port, and wherein one of the output pins is coupled to provide the mode select signal to the multiplexer circuitry.

9. A system for utilizing a multi-mode dongle with a peripheral device, comprising:
   a host information handling system having a communication port configured to be coupled to a peripheral device, the host information handling system comprising:
      detection circuitry coupled to the communication port and configured to output one or more enable signals based upon detection of a connection to the communication port; and
      mode control circuitry configured to apply mode control signals to the connection port in response to the one or more enable signals;
   a multi-mode dongle configured to be coupled the host information handling system and to a peripheral device, the dongle comprising:
      a host connection port configured to be coupled to the communication port for the host information handling system;
      a device connection port configured to couple to a peripheral device;
      mode selection circuitry within the multi-mode dongle configured to receive the mode control signals from the host information handling system through the host connection port and configured to output a mode selection signal;
      alternate mode circuitry within the multi-mode dongle configured to generate alternate mode signals, the alternate mode signals representing signals that the host information handling system is not capable of providing to the peripheral device from the communication port; and
      multiplexer circuitry coupled to receive standard mode signals from the host connection port and the alternate mode signals from the alternate mode circuitry within the multi-mode dongle, the multiplexer circuitry being configured to couple either the standard mode signals or the alternate mode signals to the device connection port depending upon the mode selection signal.

10. The system of claim 9, wherein the host connection port comprises a universal serial bus (USB) port, and wherein the device connection port comprises a USB port.

11. The system of claim 10, wherein the detection circuitry is configured to output the one or more enable signals upon detection of a connection to the USB port when the host information handling systems is in an off power state.

12. The system of claim 11, wherein the standard mode signals comprise USB signals, wherein the alternate mode signals comprise USB signals having a direct current (DC) bias voltage, and wherein the USB signals having a direct current (DC) bias voltage are configured to cause the peripheral device to accept a charging voltage through the device connection.

13. The system of claim 12, wherein the mode control signals comprise pulses applied by the host information handling system to a voltage signal line for the USB port.

14. The system of claim 9, wherein the multiplexer is configured to provide bi-directional USB communications between the host connection port and the device connection port.

15. The system of claim 9, wherein the host information handling system is configured so as to be unable to provide the alternate mode signals to the communication port.

16. A method for utilizing a multi-mode dongle with a peripheral device, comprising:
- connecting a dongle to a communication port for a host information handling system, the dongle having multiplexer circuitry configured to couple either standard mode signals or alternate mode signals to a device connection for a peripheral device, and the dongle being initially configured to provide standard mode signals from the communication port to a the device connection for the peripheral device through the multiplexer circuitry;
- receiving mode control signals from the host information handling system, the mode control signals indicating an alternate mode of operation;
- generating alternate mode signals using alternate mode circuitry within the dongle, the alternate mode signals representing signals that the host information handling system is not capable of providing to the peripheral device from the communication port;
- selecting within the dongle the alternate mode signals; and
- sending the alternate mode signals from the dongle to the device connection for the peripheral device through the multiplexer circuitry.

17. The method of claim 16, further comprising sending the mode control signals from the host information handling system to the dongle only when the host information handling system detects a connection to the communication port when the host information handling system is in at least one selected power state.

18. The method of claim 17, wherein the at least one selected power state comprises an off power state.

19. The method of claim 18, wherein the communication port comprises a universal serial bus (USB) port.

20. The method of claim 19, communicating USB signals as the standard mode signals and communicating USB signals having a direct current (DC) bias voltage as the alternate mode signals.

21. The method of claim 20, further comprising causing the peripheral device to accept a charging voltage through the device connection by sending the USB signals having a direct current (DC) bias voltage to the device connection.

22. The method of claim 21, wherein the receiving step comprises receiving a plurality of pulses on a voltage signal line for the USB port as the mode control signals.

* * * * *